United States Patent
Harris

(10) Patent No.: US 6,519,694 B2
(45) Date of Patent: *Feb. 11, 2003

(54) SYSTEM FOR HANDLING LOAD ERRORS HAVING SYMBOLIC ENTITY GENERATOR TO GENERATE SYMBOLIC ENTITY AND ALU TO PROPAGATE THE SYMBOLIC ENTITY

(75) Inventor: Jeremy G Harris, Bucks (GB)

(73) Assignee: Sun Microsystems, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,982

(22) Filed: Feb. 4, 1999

(65) Prior Publication Data

US 2001/0056530 A1 Dec. 27, 2001

(51) Int. Cl.[7] .............................. G06F 7/48; G06F 9/00
(52) U.S. Cl. .................. 712/220; 712/221; 712/222; 712/223; 712/227; 714/25; 714/48; 714/722; 708/495; 710/262
(58) Field of Search .......................... 712/23, 244, 218, 712/220, 227, 222; 714/1, 25, 48, 100, 758, 746, 752, 798, 799; 710/129, 262; 711/144; 708/497, 100, 200, 490, 496, 510, 551

(56) References Cited

U.S. PATENT DOCUMENTS

RE33,629 E * 7/1991 Palmer et al. .............. 708/510

(List continued on next page.)

FOREIGN PATENT DOCUMENTS

| EP | 0789298 A1 | 8/1997 |
| JP | 2000029866 A | 1/2000 |

OTHER PUBLICATIONS

Robert Geva, Intel and Dale Morris, Hewlett–Packard, "IA–64 Architecture Disclosures White Paper" and "IA–Architecture Innovations" (The latter presented on Feb. 23, 1999 at the Intel Developers Forum).*

(List continued on next page.)

Primary Examiner—Zarni Maung
Assistant Examiner—Wen Tai Lin
(74) Attorney, Agent, or Firm—B. Noël Kivlin

(57) ABSTRACT

In a RISC or CISC processor supporting the IEEE 754 Not-a-Number (NaN) standard and of the kind comprising a load/store unit, a register unit and an arithmetic logic unit, and wherein the load/store unit has an error flag for marking a datum loaded to the load/store unit following a load which has completed, but resulted in an error, the processor is provided with a bit pattern generator operatively arranged in an output path from the load/store unit to at least one of the register unit and the arithmetic logic unit so that a Not-a-Number value for the invalid datum is loaded into a destination one of the floating-point registers or the arithmetic logic unit. The arithmetic logic unit is configured to propagate the Not-a-Number value as a Quiet-Not-a-Number (QNaN) value through its operations. The QNaN value may be tested for in a datum by a system software command code provided for that purpose. In other embodiments of the invention, similar functionality is provided for integer registers using poison/valid bits in conjunction with an arithmetic logic unit designed to propagate the poison/valid bits through its operations. An advantage to be gained by this design is that it becomes possible to delay testing the results of a non-faulting load, since the QNaN-like symbolic entity will propagate with the results of operations on an invalid datum, thereby keeping track of the integrity of the data.

27 Claims, 4 Drawing Sheets

U.S. PATENT DOCUMENTS

| | | | | |
|---|---|---|---|---|
| 5,416,912 A | * | 5/1995 | Saini | 712/244 |
| 5,572,664 A | * | 11/1996 | Bujanos | 714/25 |
| 5,611,063 A | | 3/1997 | Loper et al. | 712/205 |
| 5,633,998 A | * | 5/1997 | Schlafly | 714/1 |
| 5,685,009 A | * | 11/1997 | Blomgren et al. | 712/23 |
| 5,692,169 A | | 11/1997 | Kathail et al. | |
| 5,694,574 A | | 12/1997 | Abramson et al. | 711/140 |
| 5,748,516 A | * | 5/1998 | Goddard et al. | 708/497 |
| 5,748,936 A | * | 5/1998 | Karp et al. | 712/218 |
| 5,761,103 A | * | 6/1998 | Oakland et al. | 708/497 |
| 5,771,392 A | * | 6/1998 | Razdow | 712/6 |
| 5,799,179 A | | 8/1998 | Ebcioglu et al. | |
| 5,881,280 A | * | 3/1999 | Gupta et al. | 712/244 |
| 5,884,062 A | * | 3/1999 | Wichman et al. | 712/218 |
| 5,915,117 A | * | 6/1999 | Ross et al. | 710/262 |
| 5,931,943 A | * | 8/1999 | Orup | 712/222 |
| 5,948,095 A | | 9/1999 | Arora et al. | 712/200 |
| 6,009,511 A | * | 12/1999 | Lynch et al. | 712/222 |
| 6,044,441 A | * | 3/2000 | Malinowski | 711/144 |
| 6,119,218 A | | 9/2000 | Arora et al. | 712/207 |
| 6,128,687 A | * | 10/2000 | Dao et al. | 710/129 |
| 6,138,135 A | * | 10/2000 | Karp | 708/496 |
| 6,170,001 B1 | | 1/2001 | Hinds et al. | 708/495 |
| 6,189,094 B1 | * | 2/2001 | Hinds et al. | 712/4 |

OTHER PUBLICATIONS

"UltraSPARC™ I & II User's Manual", Sun Microelectronics, May 1996, p. 280.

The SPARC Architecture Manual (B), SPARC International, Inc., Jan. 1994, p. 121.

"Demystifying EPIC and IA–64", Microprocessor Report, Jan. 26, 1998, pp. 21–27.

"Intel Discloses New IA–64 Features", Microprocessor Report, Mar. 8, 1999, pp. 16–19.

* cited by examiner

SYSTEM FOR HANDLING LOAD ERRORS HAVING SYMBOLIC ENTITY GENERATOR TO GENERATE SYMBOLIC ENTITY AND ALU TO PROPAGATE THE SYMBOLIC ENTITY

BACKGROUND OF THE INVENTION

The invention relates generally to the handling of load errors in computer processors, more especially but not exclusively to the handling of load errors resulting from speculative loads.

For good performance of a processor in a data processing system it is desirable to overlap data loads with other operations, by moving the load instructions forward to earlier positions in the instruction stream. When a load instruction is moved ahead of conditional control structures in the program flow, then the address it reads from may not yet be validated by the rest of the program code and may therefore be wrong. Loading of this kind is referred to as speculative.

A speculative load is thus defined a load operation that is issued by a processor before it is known whether the results of the load will be required in the flow of the program. Speculative loads can reduce the effects of load latency by improving instruction scheduling. Generally, speculative loads are generated by the compiler promoting loads to positions before test control instructions.

Speculative loads are often implemented as non-faulting loads. A non-faulting load is a load which always completes, even in the presence of faults. The semantics of a non-faulting load are the same as for any other load, except when faults occur. An example of a fault is an address-out-of-range error. When a fault occurs, it is ignored and the hardware and system software cooperate to make the load appear to complete normally, but in some way to return the result in a form which reflects that the loaded datum is invalid. Typically, the hardware will be configured to generate a fault indication for a failed normal load and to return a particular data value for a failed speculative load.

One known example of the handling of a failed load is the standard use of a poison bit or valid bit in the register into which the result of the speculative load is loaded. If the non-faulting load is successful then the poison bit remains unset or the valid bit is set. On the other hand, if the non-faulting load is unsuccessful then the poison bit is set or the valid bit remains unset. The software or hardware is then configured to ensure that any subsequent use of the data in the register generates a trap. With this approach, whenever there is an error in a non-faulting load, the program flow will enter into an error handling routine when an operation on the invalid data is attempted.

Another example of the handling of a failed load is to be found in the Sun SPARC processors UltraSPARC I & II. Here a non-faulting load returns zero-valued data when an exception (i.e. an error) is encountered. Software code then uses a compare instruction to check the load result before use, not using the speculatively loaded data if it is zero. If the result is zero, then the memory address is read again later using a normal (non-speculative) load to which normal protection mechanisms apply. The normal load will be able to differentiate between correct zero-valued data and an exception condition. Only if the normal load shows an error will an exception be caused, i.e. a trap generated. With this approach, whenever a zero result is returned from a non-faulting, speculative load, the instruction stream is stalled until the normal load has completed.

It is an aim of the invention to provide a mechanism for handling non-faulting loads which can improve program flow in the cases that non-faulting loads return invalid results.

SUMMARY OF THE INVENTION

Particular and preferred aspects of the invention are set out in the accompanying independent and dependent claims. Features of the dependent claims may be combined with those of the independent claims as appropriate and in combinations other than those explicitly set out in the claims.

According to a first aspect of the invention there is provided a processor comprising a load/store unit, a register unit comprising a set of registers and an arithmetic logic unit, the processor being of the kind in which the load/store unit has an error flag for marking as invalid a datum loaded to the load/store unit following a load which has not reliably completed and which is thus to be treated as having failed. The processor is modified by the provision of a symbolic entity transmitter operatively arranged as an output stage of the load/store unit so that a symbolic entity is loaded into a destination one of the registers or directly into the arithmetic logic unit when the error flag is set in the load/store unit following a failed load. Moreover, the arithmetic logic unit is configured to propagate the symbolic entity, when present in an operand of an operation carried out by the arithmetic logic unit, to a result of the operation, the result with symbolic entity then being conveyed either to a destination register of the register unit or the load/store unit, depending on the processor design.

In the present document, it should be noted that the term arithmetic logic unit (ALU) is used as a generic term for both integer logic units (which in the art are usually referred to as arithmetic logic units) and floating point units (FPUs).

In the case of floating-point registers in a processor conforming to IEEE 754, the symbolic entity may be a Not-a-Number (NaN) value. The symbolic entity transmitter may then take the form of a bit pattern generator interposed between the load/store unit and the register unit, and/or between the load/store unit and the ALU. The bit pattern generator is then configured and arranged to load a bit pattern of a NaN value into the load destination register or the ALU in the case of a failed load. The NaN value may be one of the large number of defined NaN values which is not used as a NaN value by the remaining hardware. Alternatively, a NaN value used by the processor for other purposes may be used. No or minimal special hardware is required in the ALU, since the ALU will automatically propagate a NaN value through arithmetic and logical operations. Moreover, no additional internal bandwidth will be required for the communication links between the load/store unit, register unit and ALU, since the failed load information is conveyed with the normal data bits.

Thus, according to a floating-point aspect of the invention, there is provided a bit pattern generator operatively arranged in an output path from the load/store unit so that a Not-a-Number value for the invalid datum is loaded into a destination one of the floating-point registers in the register unit, or directly into the ALU.

The ALU is preferably configured to propagate the Not-a-Number value as a Quiet-Not-a-Number (QNaN) value through operations carried out in the ALU. Moreover, the QNaN value is preferably testable for in a datum by a system software command code provided for that purpose. The command code may include a conversion, conditional on the test result, of the QNaN value to a Signaling-Not-a-Number (SNaN) value, so as to cause generation of a trap on subsequent use of the datum concerned. This may be especially useful in a processor supporting multiple threads of control where much of the processor execution will involve computing alternative "ways" only one of which will ultimately lie on the execution path of the code. Alternatively, the command code may include a conditional branch, conditional on the test result, for immediately invoking an error handling routine for dealing with the invalid datum.

In the case of integer registers, the symbolic entity transmitter may take the form of hardware interposed between the output-side of the load/store unit and the input-side of the register unit and/or ALU so that, in the case of a failed load, the error flag set in the load/store unit is conveyed to set or unset a poison or valid bit, respectively, in the destination register or operand of the ALU. Moreover, the ALU and register unit, or ALU register unit and load/store unit, are interconnected so as to transmit and receive the poison or valid bit from each other during processor operation, and the ALU is internally configured to propagate the poison or valid bit through its operations.

Thus, according to an integer embodiment of the invention, there is provided a reduced instruction set computer (RISC) processor, the register unit of which includes a set of integer registers, the integer registers having one or more poison bits responsive to loads from the load/store unit of invalid data, or, alternatively, one or more valid bits responsive to loads from the load/store unit or ALU of valid data, the poison or valid bits thus serving to indicate the integrity of data held in the respective registers, wherein the ALU is configured to propagate poison or valid bits present in operands of the operations to the results of the operations and to return the results together with the propagated poison or valid bits to the registers or ALU. It is noted that poison or valid bits may also be used as the symbolic entities for floating point data instead of Not-a-Number values.

Similar functionality may be provided in an another integer embodiment of the invention in a complex instruction set computer (CISC) processor by configuring the ALU to receive operands including one or more poison bits responsive to loads from the load/store unit or register unit of invalid data, or, alternatively, one or more valid bits responsive to loads from the load/store unit or register unit of valid data.

When performing an operation, the ALU of a processor according to the above-described integer aspect of the invention will return a poisoned or non-valid result if one or more of the operands of the operation are poisoned or non-valid respectively. On the other hand, the ALU will, in all cases, or all but a number of special cases, return a valid or non-poisoned result if the or each operand of the operation is valid or non-poisoned respectively. The special cases where a poisoned or non-valid result will be returned even when all operands are non-poisoned or valid will be those in which the result of an operation can be predicted as being invalid merely by virtue of, first, the operation type and, second, either the value of one operand or the combination of values of two or more operands.

A software command code may be provided for testing a datum for the presence of poison or valid bits. Moreover, a branch conditional on the result of the testing may form part of the software command code execution, whereby an invalid datum can be handled by branching to an error handling routine.

According to a further aspect of the invention there is provided a method of operation of a processor comprising an instruction unit, a load/store unit, a register unit comprising a set of registers, and an ALU, the method comprising the steps of:

a) the instruction unit issuing a load request for a datum to an external storage element;

b) the load being carried out, but returning an invalid datum to the load/store unit;

c) the load/store unit setting an error flag for the invalid datum;

d) the load completing by loading a symbolic entity as at least a part of the datum into one of the register unit and the arithmetic logic unit;

e) the arithmetic logic unit carrying out an operation having the datum as an operand such that the symbolic entity associated with the invalid datum is conveyed to a result of the operation; and f) outputting from the arithmetic logic unit the result with symbolic entity into one of the register unit and the load/store unit.

The invention, especially in some of its embodiments for floating-point operations, may be better understood by analogy with the concept of Not-a-Number (NaN) as defined by IEEE 754 (1985) which is a well-known standard for floating-point arithmetic implemented in many recently designed processors.

NaN is described in IEEE 754 and in standard literature on the programming of any processor which implements NaN. A brief summary is however now given. NaN is a symbolic entity encoded in floating-point format. The IEEE floating-point single and double formats includes a sign bit, a number of exponent bits, in the form of a biased exponent, and a number of mantissa bits conveying the fraction. The sign and mantissa collectively form the significand. Reserved values of the exponents are used to encode NaN's. The reserved values may be any values apart from those two reserved for +/− infinity. If the biased exponent is all ones (in its binary representation) and the fraction is not zero then the significand conveys a NaN.

The NaN standard applies to arithmetic operations such as add, subtract, multiply, divide and square root, as well as to various other arithmetic and logical operations, such as conversions between number formats, remaindering and rounding, and optionally copying without change of format. If one or more signaling NaN (SNaN) values are input to an operation then an exception is signalled. If one or more quiet NaN (QNaN) values are input to an operation, and no SNaN's, then the operation signals no exception and delivers as its result a QNaN. With each exception there is typically an associated trap under software control. SNaN's thus signal the invalid operation exception whenever they appear as operands and will result in the setting of a status flag, taking a trap or both. On the other hand, QNaN's propagate through almost every arithmetic operation without signaling exceptions.

Now, by analogy with NaN, the invention may be thought of as the provision of a symbolic entity similar to a propagating QNAN which propagates when operations are carried out on an invalid datum resulting from a failed speculative load.

In contrast, with fore-knowledge of the present invention, the prior art use of a poison bit or valid bit in conjunction with trapping, as described above, may be thought of as analogous to the provision of a non-propagating SNaN. A QNaN-type functionality cannot be provided with the conventional design, since there is no means for generating a propagatable QNaN-like bit pattern in the load/store unit when the flag for a failed speculative load is set. Moreover, for non-floating-point operations, a conventional ALU has no means for propagating a QNaN-like entity through its operations, even if one could be generated.

An advantage achievable with some embodiments of the invention is that it becomes possible to delay testing the results of a non-faulting load, since the QNaN-like symbolic entity will propagate with the results of operations on an invalid datum, thereby keeping track of the integrity of the data. This has the benefit that program flow does not have to be slowed or otherwise disrupted by testing non-faulting load results as the loads occur, but can be deferred until some other time, for example when processor time is freely available, under the control of the program. The testing can be performed when convenient and, if the test reveals a QNaN-like entity, i.e. data corrupted by an earlier failed speculative load, then this can be dealt with, for example immediately by branching to a servicing routine, or by converting the QNaN-like entity to a SNaN-like entity so as to cause trapping on subsequent use.

Although the invention was conceived with the handling of failed speculative loads specifically in mind, it will be appreciated that the processor designs herein described are equally well suited to handling failed loads of any type. Delay of testing the results of loads of any kind may be advantageous for the same reason as described above in relation to non-faulting loads. One example of the utility of the propagatable, error indicating, symbolic entity for normal loads would be to provide hardware protection against programming errors of the kind which may result in illegal loads from external storage, e.g. a load from an address that does not exist. The invention may thus be embodied in processors that do not support non-faulting loads, and also in processors that do support non-faulting loads for handling both failed normal loads and failed speculative loads.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
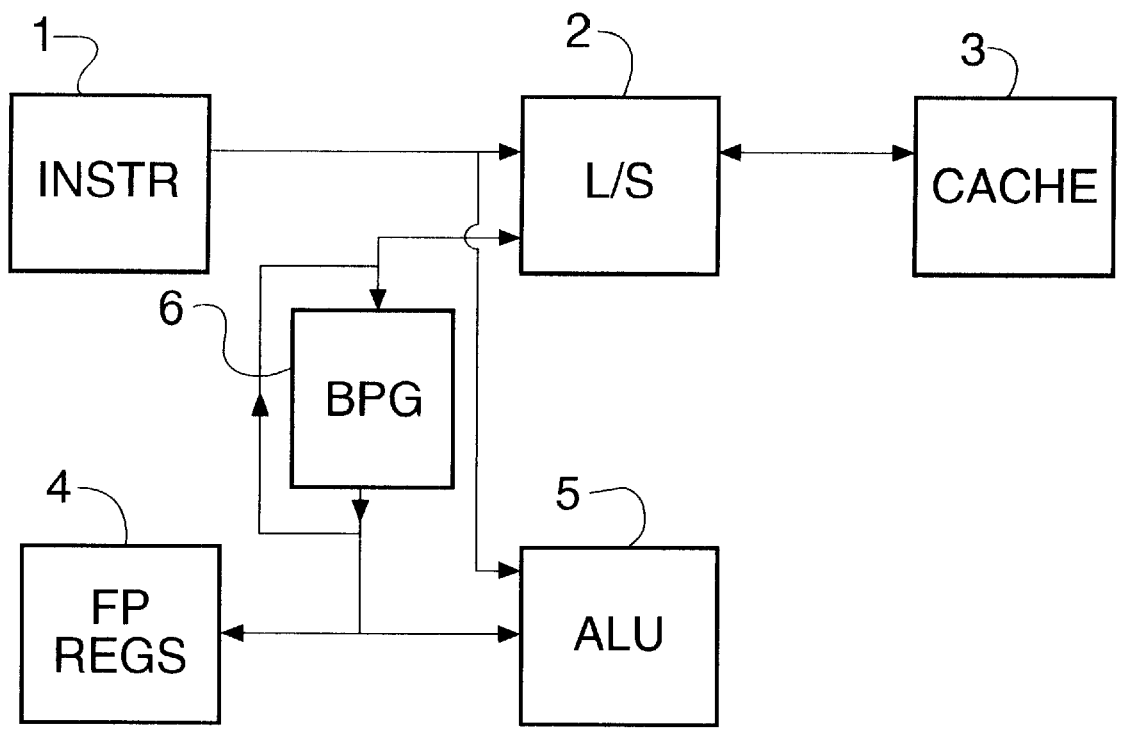
FIG. 1 shows a floating-point processor according to a first embodiment of the invention.

FIG. 1 shows a processor according to a first embodiment of the invention. The processor comprises the conventional components of an instruction unit 1, a load/store unit 2, a register unit including a set of floating-point registers 4, and an arithmetic logic unit (ALU) 5 in the form of a floating point unit (FPU). These components are interconnected internally and externally in a generally conventional fashion for a reduced instruction set computer (RISC) processor. Namely, there is an internal line of control from the instruction unit 1 to the load/store unit 2, from the instruction unit 1 to the ALU 5, and from the load/store unit 2 to the register unit 4, and also bidirectional internal lines of control between the register unit 4 and the ALU 5. Furthermore, external to the processor unit there is a memory cache 3 which interfaces with the processor unit through the load/store unit 2 through an external input/output of the load/store unit 2 provided for that purpose. This arrangement is also conventional. Instead of a cache, the processor may interact directly with any other external storage, such as a main memory unit.

The floating-point processor of FIG. 1 is of the kind capable of supporting speculative loads from an external data storage, in this case the cache 3. For this purpose, the load/store unit 2 has an error flag for marking a datum loaded to the load/store unit 2 following a speculative load which has loaded a datum that has not yet been validated by the rest of the program code and may therefore be wrong.

The generally conventional RISC architecture of the processor unit of FIG. 1 is departed from by the inclusion of a bit pattern generator 6 operatively arranged on the internal output side of the load/store unit 2, more particularly in the data path from the load/store unit 2 to the register unit 4. The reverse path from the register unit 4 to the load/store unit 2 is not affected by the bit pattern generator 6. The bit pattern generator 6 is configured to generate as an output a Not-a-Number (NaN) value. In the course of a load completion, a datum is loaded from the load/store unit 2 into a destination one of the floating-point registers contained in the register unit 4. The bit pattern generator 6 is responsive to the error flag in the load/store unit 2 for the datum being loaded. If the error flag is not set, then the datum is passed unchanged from the load/store unit 2 to the register unit 4, i.e. the bit pattern generator 6 has no operational effect. On the other hand, if the error flag in the load/store unit 2 is set, indicating a load which has not completed reliably, i.e. failed, then the bit pattern generator 6 acts to load the reserved NaN value into the destination register, instead of the datum loaded into the load/store unit 2 from the external storage 3. The error flag will be set following a failed load of any kind and a failed speculative load is but one example of a load error.

The ALU 5 is configured to handle the NaN value generated by the bit pattern generator 6 as a Quiet-not-a-Number (QNaN) value. As described further above, a QNaN value is one which propagates through operations in the ALU 5 without signaling exceptions. The NaN value generated by the bit pattern generator 6 may be a general QNaN value used for normal purposes in the processor, or may be a separate NaN value which the processor is also designed to propagate in the manner of a QNaN and which is specific to data resulting from failed loads. (Here it is noted that current processors typically has a very large number of unused NaN values. For example, in the Intel pentium processor for single precision format floating-point numbers there are $2^8 - 3$ available NaN values only a few of which are used).

In the case that a general QNaN value is generated by the bit pattern generator, the qualities of the conventional floating-point NaN value would be merged with the non-valid-datum NaN value. The special NaN value usage according to the invention would then be integrated with the semantics required by conventional NaN value handling of a processor that conforms with IEEE 754.

On the other hand, in the case that a separate QNaN value is designated specifically for the purpose of tagging non-validated data resulting from failed loads, there is then the possibility of providing a more sophisticated protocol for responding to failed loads, either programmatically or in hardware. Furthermore, different QNaN values may be used for different types of load error. For example, data from failed speculative loads may be ascribed one QNaN value and data from failed normal loads another QNaN value.

Figure 2:
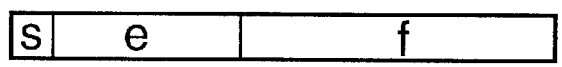
FIG. 2 shows the format of a floating-point number supported by the processor of FIG. 1.
Figure 3:
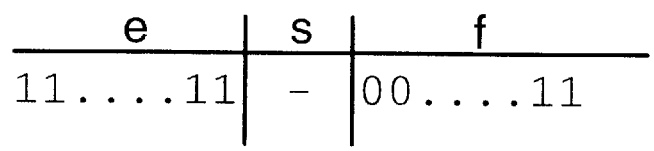
FIG. 3 is a table of the exponent, significand and fraction parts of the floating-point format of FIG. 2.

FIG. 2 shows the basic format of a floating-point number, for example either in conventional single or double precision, as used in IEEE 754. The floating-point numbers are composed of three fields, namely a one bit sign field "s", a multi-bit biased exponent "e" and a multi-bit fraction "f". In conventional single precision format, the exponent has 8 bits and the fraction 23 bits, thereby to provide a significand of 24 bits (including the sign bit). Conventionally, and as shown in FIG. 3, NaN values are defined as values of the fraction part of the significand which may have any value apart from 10 . . . 00 when all the bits of the biased exponents are ones, i.e. 11 . . . 11, and when the sign bit has a negative value.

In operation, the bit pattern generator 6 thus ensures that speculative loads which load invalid, or non-validated, data will result in QNaN values being loaded into the destination registers of the register unit 4. The conventional NaN value support provided in the ALU 5 will then ensure that any results of operations which use any of the invalid data are themselves given the QNaN value. In this way, program flow need not be interrupted until a convenient time, since data integrity is tracked through the QNaN propagation process. The particular action needed to deal with a failed load may be delayed for as many instructions as needed, while still permitting manipulation and use of the results of the load, should it complete normally in the manner of a non-faulting load.

In one implementation, the system software code is provided with a command for testing for the validity of any datum by means of testing the datum for the QNaN value generated by the bit pattern generator 6. Moreover, the processor is configured, or its software designed, so that the QNaN test command is required to be issued before selected operations, such as an attempt to use a non-valid datum as an address for a load or store, an attempt to store a non-valid datum, or an attempt to use a non-valid datum to alter internal processor functional modes. A positive test result may then cause a trap to be generated or a branch to a servicing routine. A still further option would be to provide a trap on use of a non-valid datum, the trap being switchable by the program.

A trapping function may be implemented by providing a command for converting the value of a datum to a SNaN value. The SNaN value may be either a general SNaN value used in normal processor operation, or one or more special SNaN values specific to data resulting from failed loads. (Here it is noted that any processor supporting IEEE 754 will have at least one SNaN value and associated support). The conversion command would typically be used following a test command returning a positive result, thereby converting a QNaN value into a SNaN value. The SNaN value will automatically trap on use, or invoke whatever other general SNaN servicing routines are present in the processor hardware or software, since, by definition, a SNaN value will signal an invalid operation exception whenever it appears as an operand of an operation.

Figure 4:
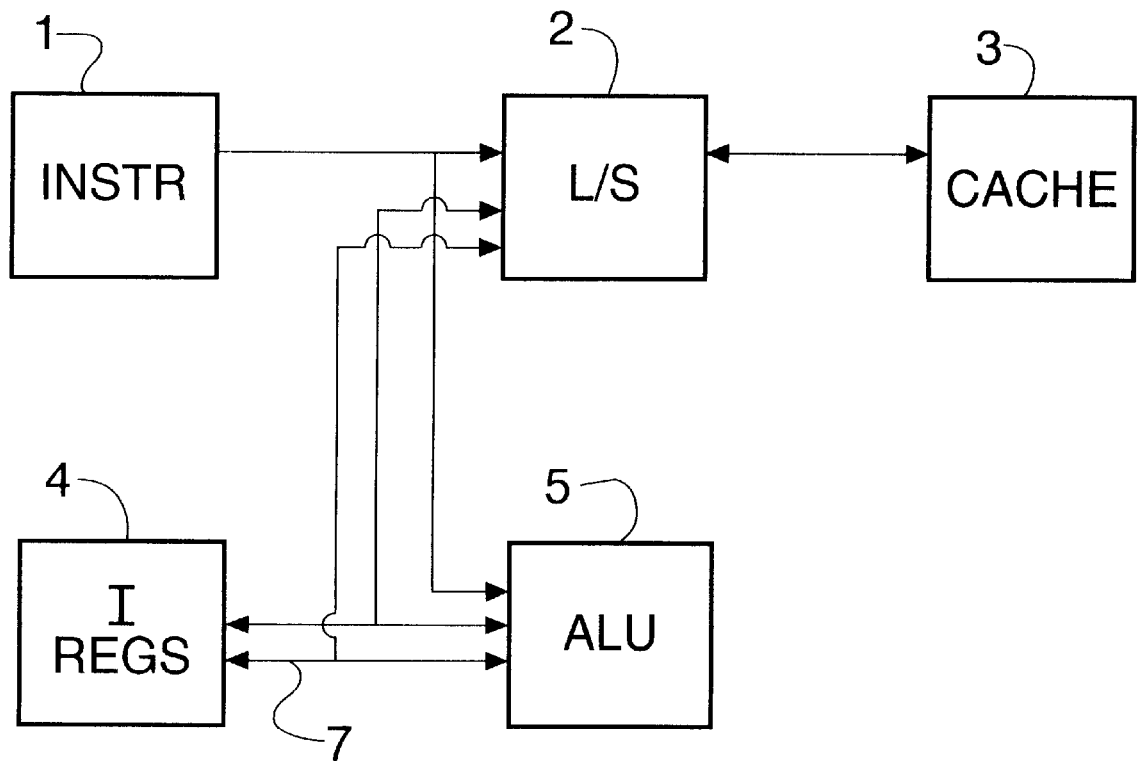
FIG. 4 shows an integer processor according to a second embodiment of the invention.

FIG. 4 shows a processor according to a second embodiment of the invention interfaced to an external storage element. The processor unit of the second embodiment includes an instruction unit 1, a load/store unit 2, a register unit 4 including a set of integer registers, and an ALU 5 for integer arithmetic operations. The processor unit is connected to an external storage element in the form of a memory cache 3, the processor unit being connected to the cache 3 through the load/store unit 2. The components of the processor unit are connected in a generally conventional manner. Namely, there is a line of control from the instruction unit 1 to the load/store unit 2, from the instruction unit 1 to the ALU 5, and from the load/store unit 2 to the register unit 4, and also bidirectional lines of control between the register unit 4 and the ALU 5.

By contrast to a conventional RISC processor unit, the communication path between the register unit 4 and the ALU 5 is provided with one bit of extra bandwidth through an additional bus line 7 which is shown in FIG. 4, for the sake of convenience only, as being separate from the remaining internal bus lines interconnecting the register unit 4 and the ALU 5. An extension of the bus line 7 is linked to the load/store unit 2.

Each of the integer registers of the register unit 4 have a poison/valid bit responsive to loads from the load/store unit 2 of failed, speculatively loaded, data. The poison/valid bits thus indicate the integrity of the datum held in the integer register concerned. The provision of poison/valid bits responsive to the error flag in the load/store unit is known, as is the loading of a poison or valid bit into a destination register of the register unit from the load/store unit. However, the processor of FIG. 4 differs from a conventional design in that the register unit 4 and ALU 5 are configured to pass the poison/valid bits with their associated data during in inter-communication between these components. Moreover, the ALU 5 is configured to propagate the poison/valid bits present in any operand of an operation to the result or results of that operation, and to return the results together with the propagated poison/valid bits to the integer registers in the register unit, using the additional bus line 7 for communication of the poison/valid bits. In this way, the same functionality as described above for the first embodiment in respect of floating-point registers, i.e. the quiet propagation of a symbolic entity tagging data validity, can also be provided for integer registers.

Figure 5:
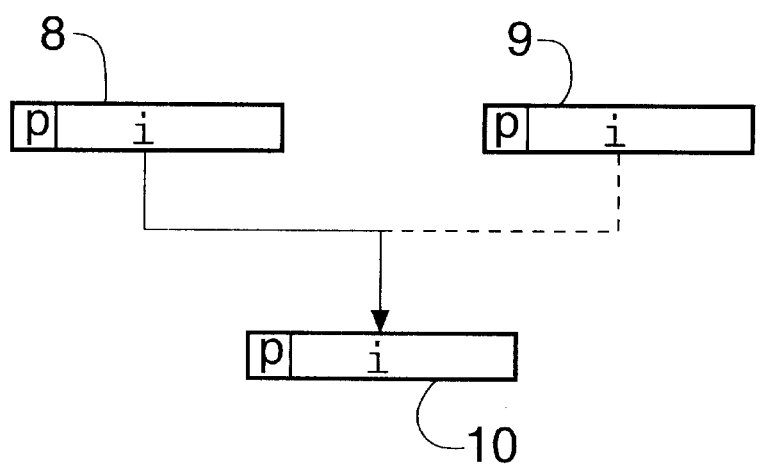
FIG. 5 shows the flow of an operation supported by the arithmetic logic unit of the integer processor of FIG. 4.

As shown in FIG. 5, a given operation carried out in the ALU 5 will have a first integer operand 8, and optionally one or more further integer operands 9. Each operand includes an integer datum part "i" and a poison bit "p". (Here it will be understood that valid bits may be used instead of poison bits and also that multiple poison bits or valid bits may be used instead of a single poison bit or a single valid bit respectively). The operation on the or each operand will complete to generate an operation result 10, also having an integer datum portion "i" and a poison bit "p". The hardware of the ALU 5 is configured to ensure that the poison bit of the result 10 is set if one or more of the poison bits of the or each operand is set. As will be appreciated, the internal hardware of the ALU 5 may be implemented to provide this functionality for all of its operations or only for a defined subset of its operations.

Figure 6:
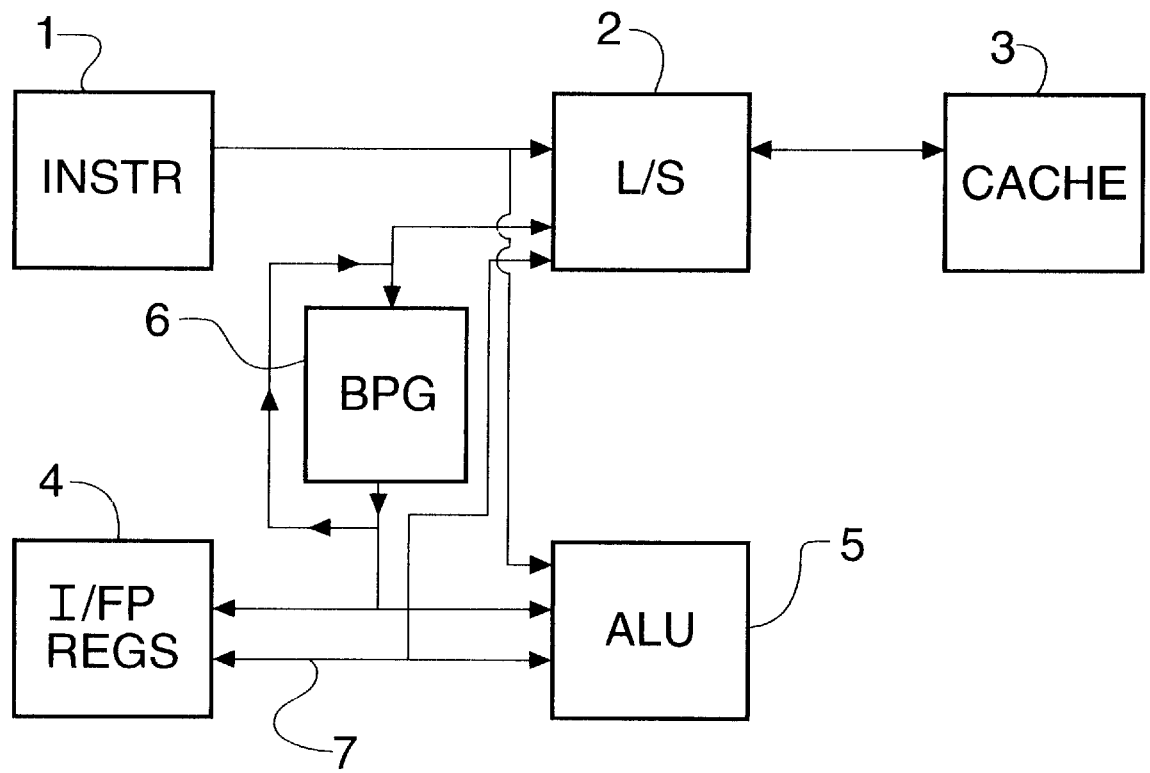
FIG. 6 shows a combined floating-point and integer processor according to a third embodiment of the invention.

FIG. 6 shows a third embodiment of the invention which is a hybrid of the first and second embodiments of the invention in which the register unit 4 has a set of floating-point registers and a set of integer registers, both of which support propagation of a data-integrity signifying symbolic entity. A bit pattern generator 6, as described in connection with the first embodiment, is provided to support the functionality for the floating-point registers and a bus line 7 and modified internal hardware design of the ALU 5 is provided to support the same functionality for the integer registers, as in the second embodiment.

Figure 7:
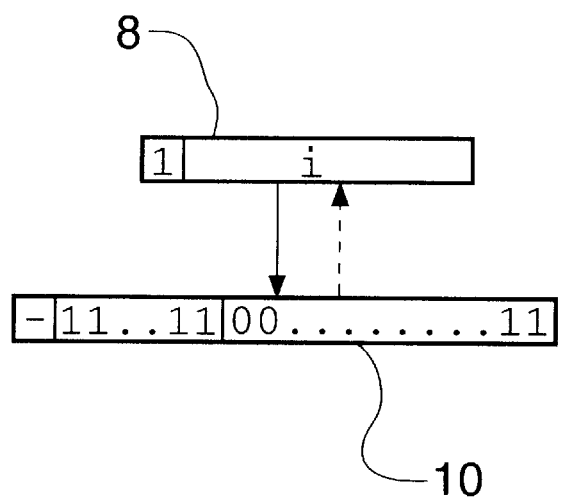
FIG. 7 shows the flow of conversion operations supported by the arithmetic logic unit of the processor of FIG. 6.

The ALU of the third embodiment supports both floating point and integer arithmetic operations. Floating-point operations are handled in the manner described for the first embodiment and integer operations are handled in the manner described for the second embodiment. In addition to these operations, there will also be integer-to-floating-point conversion operations in the third embodiment, as shown in FIG. 7 with the solid arrow. Such a conversion operation has an integer operand. The conversion process is responsive to the poison bit which, if set, will result in the reserved QNaN value generated by the bit pattern generator 6 being defined as the result of the conversion process, as shown in FIG. 7. Similarly the ALU 5 is configured to support the reverse floating-point-to-integer conversion process, setting the poison bit of the result if the operand has the QNaN value, or indeed any NaN value, as shown in FIG. 7 by the dashed arrow. The ALU 5 is also configured to set the poison bit in the case of a conversion overflow.

According to a fourth embodiment of the invention (not separately illustrated) there is provided a floating point processor having the same basic structure as shown for the integer processor of FIG. 4. In the floating point processor of the fourth embodiment, poison/valid bits are used as the symbolic entities indicating an error status in the datum concerned, as opposed to NaN-like symbolic entities, as in the first embodiment. The load/store unit of the fourth embodiment may optionally be provided with a conversion unit. The conversion unit is operable on storing a datum to convert a datum with set poison or unset valid bits to a NaN value. Moreover, the conversion unit is operable on loading a datum to set the poison or unset the valid bits when a datum having a NaN value is loaded into the processor.

According to a fifth embodiment of the invention (not separately shown) there is provided a combined integer and floating point processor having the same basic structure as shown for the integer processor of FIG. 4. In the processor of the fifth embodiment, poison/valid bits are used as the symbolic entities both for integer data and floating point data, substantially as described with reference to the fourth embodiment.

The above described embodiments relate to processor units with a reduced instruction set computer (RISC) architecture. The invention may however also be embodied in processor units with a complex instruction set computer (CISC) architecture, as described in more detail further below. In a CISC architecture, data which are operands of operations to be carried out in the ALU may be directly loaded from the load/store unit into the ALU, not via the register unit. Moreover, the ALU may directly output data, for example the results of operations, to the load/store unit, not via the register unit. The register unit is connected to the ALU, as in a RISC architecture, and can thus serve to store intermediate results from the ALU, for example. CISC architectures may also allow for loading of data from the load/store unit into the register unit and storing of data from the register unit to the load/store unit, as in a RISC architecture.

Figure 8:
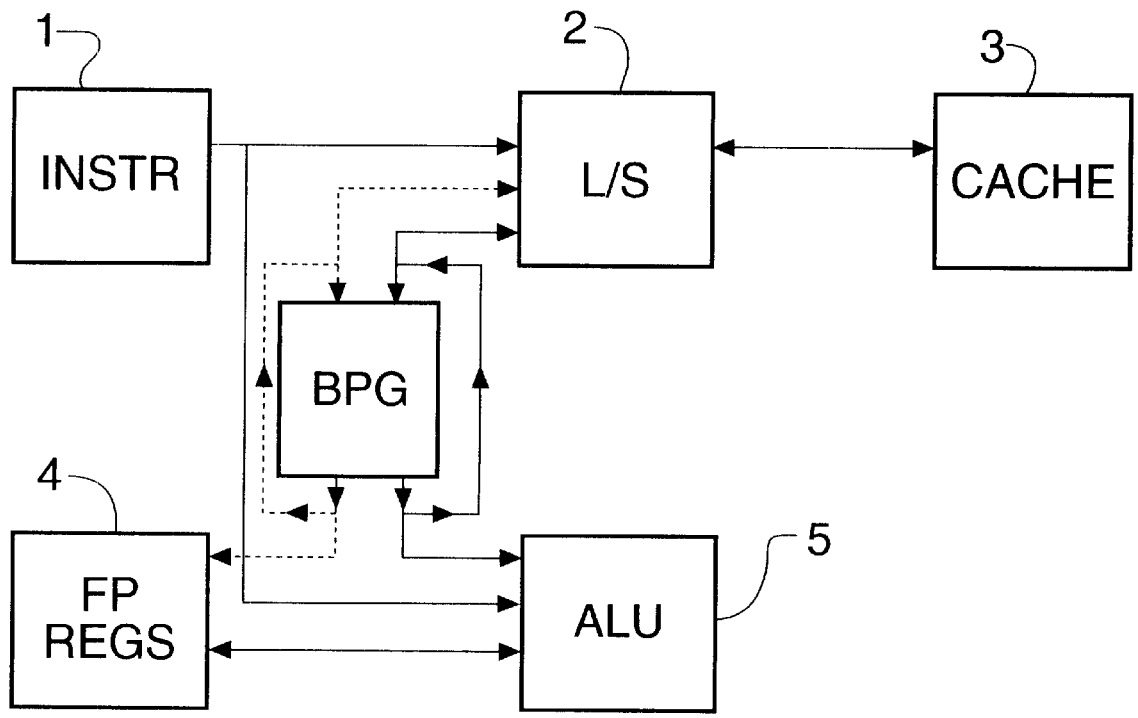
FIG. 8 shows a floating-point processor according to a sixth embodiment of the invention.

FIG. 8 shows a processor according to a sixth embodiment of the invention. The processor comprises the conventional components of an instruction unit 1, a load/store unit 2, a register unit including a set of floating-point registers 4, and an ALU 5 in the form of a FPU. These components are arranged in a generally conventional fashion for a complex instruction set computer (CISC) processor. Namely, there is a line of control from the instruction unit 1 to the load/store unit 2 and from the instruction unit 1 to the ALU 5, and also bi-directional lines of control between the load/store unit 2 and the ALU 5 and between the register unit 4 and the ALU 5. In addition, as shown by dashed lines, bi-directional lines of control may exist between the load/store unit 2 and the register unit 4. Furthermore, external to the processor unit there is a memory cache 3, or other external storage, which interfaces with the processor unit through the load/store unit 2, more especially through an input/output arranged on the external side of the load/store unit 2. This arrangement is also conventional.

The floating-point processor of FIG. 8 is of the kind capable of supporting speculative loads from an external data storage, in this case cache 3, using an error flag as described for the first embodiment.

The generally conventional CISC architecture of the processor unit of FIG. 8 is departed from by the inclusion of a bit pattern generator 6 operatively arranged on the output side of the internal input/output of the load/store unit 2, more particularly in the data path from the load/store unit 2 to the ALU 5. The reverse path from the ALU 5 to the load/store unit 2 is not affected by the bit pattern generator 6. If there is a data path between the load/store unit 2 and the register unit 4, as indicated by the dashed lines in FIG. 8, then the bit pattern generator 6 is also operatively arranged in the data path between those two components. For this optional data path, the operation of the bit pattern generator 6 will be the same as described with reference to the first embodiment and is thus not further discussed. The bit pattern generator 6 is configured to generate as an output a NaN value. In the course of a load completion, a datum is loaded from the load/store unit 2 into a destination operand location of the ALU 5. The bit pattern generator 6 is responsive to the error flag in the load/store unit 2 for the datum being loaded. If the error flag is not set, then the datum is passed unchanged from the load/store unit 2 to the ALU 5, i.e. the bit pattern generator 6 has no operational effect. On the other hand, if the error flag in the load/store unit 2 is set, indicating a failed load, then the bit pattern generator 6 acts to load the reserved NaN value into the destination operand of the ALU, instead of the datum loaded into the load/store unit 2 from the external storage 3.

The operational effect of the bit pattern generator 6 in the CISC processor of the sixth embodiment is thus generally analogous to that in the RISC processor of the first embodiment, the difference being that data is loaded into, and downloaded from, the ALU 5 rather than the register unit 4. Both these embodiments have in common that the bit pattern generator 6 is arranged to act as an output stage of the load/store unit located on the processor-internal side of the load/store unit 2.

Figure 9:
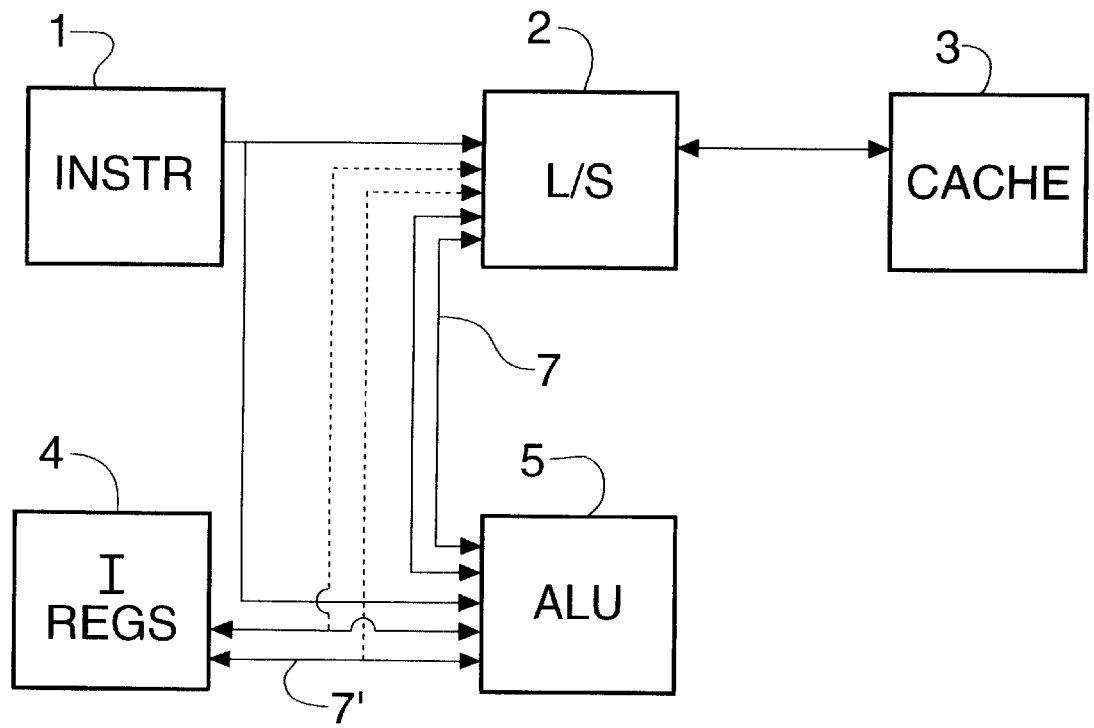
FIG. 9 shows an integer processor according to a seventh embodiment of the invention.

FIG. 9 shows a processor according to a seventh embodiment of the invention interfaced to an external storage element. The processor unit of the second embodiment includes an instruction unit 1, a load/store unit 2, a register unit 4 including a set of integer registers, and an ALU 5 for integer arithmetic operations. The processor unit is connected to an external storage element in the form of a memory cache 3, the processor unit being connected to the cache 3 through the load/store unit 2. The components of the processor unit are connected generally in the manner of a conventional CISC processor. Namely, there is a line of control from the instruction unit 1 to the load/store unit 2, from the instruction unit 1 to the ALU 5, and also bi-directional lines of control between the load/store unit 2 and the ALU 5 and between the register unit 4 and the ALU 5. Optionally, the bi-directional line of control between the register unit 4 and the ALU 5 may have an extension to the load/store unit 2 in the manner of a RISC processor, as shown by dashed lines in FIG. 9.

By contrast to a conventional CISC processor unit, the communication paths between the load/store unit 2 and the ALU 5 and between the register unit 4 and the ALU 5 are both provided with one bit of extra bandwidth through additional bus lines 7 and 7' respectively. The additional bus lines 7 and 7' are shown in FIG. 9, for the sake of convenience only, as being separate from the remaining internal bus lines. An extension of the bus line 7' may optionally be provided to link the register unit 4 to the load/store unit 2, as shown in FIG. 9 with dashed lines. The bus line extension would provide a similar functionality to the corresponding connection in the RISC processor of the second embodiment.

The processor of FIG. 9 differs from a conventional CISC design in that the load/store unit 2 and ALU 5 are configured so that a set error flag in the load/store unit will load into a destination operand of the ALU 5 as one or more poison or valid bits. Similarly, poison/valid bits pass with their associated data during communication from the ALU 5 to the load/store unit. Moreover, the ALU 5 is configured to propagate the poison/valid bits present in any operand of an operation to the result or results of that operation, and to return the results together with the propagated poison/valid bits to either the load/store unit 2 or the integer registers in the register unit 4, using the additional bus lines 7 and 7' respectively for communication of the poison/valid bits. In this way, the same functionality as described above for the first and sixth embodiments in respect of floating-point registers, i.e. the quiet propagation of a symbolic entity for tagging data validity, can also be provided for integer registers.

Each of the integer registers of the register unit 4 have a poison/valid bit responsive to loads from the ALU 5, and optionally the load/store unit 2, of failed, speculatively loaded, data. The poison/valid bits thus indicate the integrity of the data present as results of an operation in the ALU 5 and data held in the integer registers.

According to an eighth embodiment of the invention (not separately shown) there is provided a combined integer and floating point CISC processor which is a hybrid of the CISC processors of the sixth and seventh embodiments of the invention in which the register unit 4 has a set of floating-point registers and a set of integer registers, both of which support propagation of a data-integrity signifying symbolic entity. A bit pattern generator 6, as described and illustrated in connection with the sixth embodiment, is provided to support the functionality for the floating-point registers and a bus line 7 and modified internal hardware design of the ALU 5 is provided to support the same functionality for the integer registers, as described and illustrated in relation to the seventh embodiment.

According to a ninth embodiment of the invention (not separately shown) there is provided a CISC processor with an ALU that supports both floating point and integer arithmetic operations. Floating-point operations are handled in the manner described for the sixth embodiment and integer operations are carried out in the manner described for the seventh embodiment. In addition to these operations, there will also be integer-to-floating-point conversion operations and floating-point-to-integer conversion operations, substantially as illustrated in and described with reference to FIG. 7.

In any of the above-described embodiments of the invention, the ALU 5 may be further modified as follows. Selected types of operation supported by the ALU 5 may, given a certain operand or combination of operands, necessarily cause an invalid or undefined result. One example would be a divide-by-zero operation in integer long-division. Another example would be an overflow in an integer or floating-point arithmetic operation. In such cases, the ALU 5 may be configured to define the result as the reserved QNaN value in the case of a floating-point result or by setting the poison bit in the case of a floating-point or integer result. In either case, the symbolic entity defined by the QNaN value or the poison bit would then be stored in the associated register of the register unit and, if further operations were carried out on that datum, these would be handled in the same way as described above, thus allowing failure testing to be delayed also in the case of ALU generated errors as well as errors resulting from invalid speculative load results.

Indeed this functionality could be provided on its own without the capability of delaying faults on loads. For example, a further embodiment of the invention provides a processor for integer operations configured to support poison/valid bits that are propagatable through ALU operations, as described with reference to the second embodiment, wherein the ALU is configured to return a result with a set poison bit (or unset valid bit), when, for one or more prespecified operations, an operand or combination of operands have a predefined value or combination of values. Such a processor may combine floating-point and integer support.

It will be appreciated that although particular embodiments of the invention have been described, many modifications/additions and/or substitutions may be made within the spirit and scope of the present invention as defined in the appended claims.

What I claim is:

1. A processor comprising a register unit having a set of registers, an arithmetic logic unit and a load/store unit, the load/store unit being connected to at least one of the arithmetic logic unit and the register unit by a data path and having an error flag that, when set, marks as invalid a datum received from an external storage element following a load which has resulted in an error, the processor further comprising symbolic entity generating hardware operatively arranged in said data path from the load/store unit so as to generate and transmit a symbolic entity to said at least one of the arithmetic logic unit and the register unit when an invalid datum is output from the load/store unit for said at least one of the arithmetic logic unit and the register unit, the datum determined invalid by error recognition hardware in the symbolic entity generator responsive to the error flag being set, the arithmetic logic unit being configured to propagate the symbolic entity, when present in an operand of an operation carried out by the arithmetic logic unit, to a result of the operation.

2. A processor according to claim 1, wherein the load/store unit is arranged to communicate with the register unit, the symbolic entity generating hardware being operatively arranged in the data path from the load/store unit to the register unit.

3. A processor according to claim 1, wherein the load/store unit is arranged to communicate with the arithmetic logic unit, the symbolic entity generating hardware being operatively arranged in the data path from the load/store unit to the arithmetic logic unit.

4. A processor according to claim 1, wherein the load/store unit is arranged to communicate with the arithmetic logic unit, the symbolic entity generating hardware being operatively arranged in the data path from the load/store unit to the arithmetic logic unit and the register unit.

5. A processor according to claim 1, wherein the set of registers is a set of floating-point registers and the symbolic entity generating hardware includes a bit pattern generator operatively arranged to output a Not-a-Number value when an invalid datum is received from the load/store unit.

6. A processor according to claim 5, wherein the arithmetic logic unit is configured to propagate the Not-a-Number value as a Quiet-Not-a-Number value through operations carried out in the arithmetic logic unit.

7. A processor according to claim 6 responsive to a software command code testing a datum for the presence of a Quiet-Not-a-Number value.

8. A processor according to claim 7, responsive to the software command code so as to cause execution of a branch conditional on the result of the testing, whereby an invalid datum can be handled.

9. A processor according to claim 7, responsive to the software command code conditional on the result of the testing so as to cause conversion of the Quiet-Not-a-Number value to a Signaling-Not-a-Number value, whereby subsequent use of the invalid datum will generate a trap.

10. A processor according to claim 1, wherein the set of registers includes integer registers, and the symbolic entity generating hardware is operatively arranged to output one of poison and valid bits as a symbolic entity, responsive to the error flag in the load/store unit.

11. A processor according to claim 10 responsive to a software command code testing a datum for the presence of one of poison and valid bits.

12. A processor according to claim 11, responsive to the software command code so as to cause execution of a branch conditional on the result of the testing, whereby an invalid datum can be handled.

13. A processor according to claim 1, wherein the set of registers includes floating-point registers and integer registers, the symbolic entities being Not-a-Number values for floating-point data and one of poison and valid bits for integer data.

14. A processor according to claim 13, wherein the arithmetic logic unit is configured to propagate the Not-a-Number value as a Quiet-Not-a-Number value through operations carried out in the arithmetic logic unit.

15. A processor according to claim 1, wherein the set of registers includes floating-point registers and integer registers, the symbolic entities being one of poison and valid bits both for floating-point data and for integer data.

16. A processor according to claim 1, wherein the arithmetic logic unit and the register unit are interconnected so as to transmit and receive the symbolic entities with respective data passing between the arithmetic logic unit, the register unit and the load/store unit.

17. A processor according to claim 1, wherein, for at least one prespecified type of operation, the arithmetic logic unit is configured to generate the symbolic entity as a result when an operand of the operation is not an invalid datum and has a predefined value.

18. A processor according to claim 1, wherein, for at least one prespecified type of operation, the arithmetic logic unit is configured to generate the symbolic entity as a result when at least two operands of the operation have a predefined combination of values and are not invalid data.

19. A method of operation of a processor comprising an instruction unit, a load/store unit, a register unit comprising a set of registers, and an arithmetic logic unit, the method comprising the steps of:

a) the instruction unit issuing a load request for a datum to an external storage element;

b) the load being carried out, but returning an invalid datum to the load/store unit;

c) the load/store unit setting an error flag for the invalid datum;

d) the load completing by loading a symbolic entity as at least a part of the datum into at least one of the arithmetic logic unit and the register unit, wherein the symbolic entity is generated by symbolic entity generating hardware responsive to error recognition hardware in the symbolic entity generating hardware determining that the error flag is set;

e) the arithmetic logic unit carrying out an operation having the datum as an operand such that the symbolic entity associated with the invalid datum is conveyed to a result of the operation; and f) outputting from the arithmetic logic unit the result with symbolic entity into at least one of the load/store unit and the register unit.

20. The processor as recited in claim 1, wherein the symbolic entity generating hardware is a bit pattern generator.

21. The method as recited in claim 19 further comprising outputting a Not-A-Number values when an invalid datum is received from the load/store unit.

22. The method as recited in claim 21 further comprising the arithmetic logic unit propagating a Not-a-Number value as a Quiet-Not-a-Number value through operations carried out in the arithmetic logic unit.

23. A processor comprising a register unit having a set of registers, an arithmetic logic unit and a load/store unit, the load/store unit being connected to at least one of the arithmetic logic unit and the register unit by a data path and having an error flag for marking as invalid a datum received from an external storage element following a load which has resulted in an error, the processor further comprising a symbolic entity generator operatively arranged in said data path from the load/store unit so as to generate and transmit a symbolic entity to said at least one of the arithmetic logic unit and the register unit when an invalid datum is output from the load/store unit for said at least one of the arithmetic logic unit and the register unit, the arithmetic logic unit being configured to propagate the symbolic entity, when present in an operand of an operation carried out by the arithmetic logic unit, to a result of the operation, wherein for at least one prespecified type of operation, the arithmetic logic unit is configured to generate the symbolic entity as a result when an operand of the operation is not an invalid datum and has a predefined value.

24. A processor comprising a register unit having a set of registers, an arithmetic logic unit and a load/store unit, the load/store unit being connected to at least one of the arithmetic logic unit and the register unit by a data path and having an error flag for marking as invalid a datum received from an external storage element following a load which has resulted in an error, the processor further comprising a symbolic entity generator operatively arranged in said data path from the load/store unit so as to generate and transmit a symbolic entity to said at least one of the arithmetic logic unit and the register unit when an invalid datum is output from the load/store unit for said at least one of the arithmetic logic unit and the register unit, the arithmetic logic unit being configured to propagate the symbolic entity, when present in an operand of an operation carried out by the arithmetic logic unit, to a result of the operation wherein for at least one prespecified type of operation, the arithmetic logic unit is configured to generate the symbolic entity as a result when at least two operands of the operation have a predefined combination of values and are not invalid data.

25. A method of operation of a processor comprising an instruction unit, a load/store unit, a register unit comprising a set of registers, and an arithmetic logic unit, the method comprising the steps of:

a) the instruction unit issuing a load request for a datum to an external storage element;

b) the load being carried out, but returning an invalid datum to the load/store unit;

c) the load/store unit setting an error flag for the invalid datum;

d) the load completing by loading a symbolic entity as at least a part of the datum into at least one of the arithmetic logic unit and the register unit, wherein the symbolic entity is generated by a symbolic entity generator;

e) the arithmetic logic unit carrying out an operation having the datum as an operand such that the symbolic entity associated with the invalid datum is conveyed to a result of the operation, wherein for at least one prespecified type of operation, the arithmetic logic unit generates the symbolic entity as a result when an operand of the operation is not an invalid datum and has a predefined value; and f) outputting from the arithmetic logic unit the result with symbolic entity into at least one of the load/store unit and the register unit.

26. A method of operation of a processor comprising an instruction unit, a load/store unit, a register unit comprising a set of registers, and an arithmetic logic unit, the method comprising the steps of:

a) the instruction unit issuing a load request for a datum to an external storage element;

b) the load being carried out, but returning an invalid datum to the load/store unit;

c) the load/store unit setting an error flag for the invalid datum;

d) the load completing by loading a symbolic entity as at least a part of the datum into at least one of the arithmetic logic unit and the register unit, wherein the symbolic entity is generated by a symbolic entity generator;

e) the arithmetic logic unit carrying out an operation having the datum as an operand such that the symbolic entity associated with the invalid datum is conveyed to a result of the operation, wherein for at least one prespecified type of operation, the arithmetic logic unit is generates the symbolic entity as a result when at least two operands of the operation have a predefined combination of values and are not invalid data; and f) outputting from the arithmetic logic unit the result with symbolic entity into at least one of the load/store unit and the register unit.

27. A processor comprising a register unit having a set of registers, wherein the set of registers is a set of floating point registers, an arithmetic logic unit and a load/store unit, the load/store unit being connected to at least one of the arithmetic logic unit and the register unit by a data path and having an error flag for marking as invalid a datum received from an external storage element following a load which has resulted in an error, the processor further comprising a symbolic entity generator operatively arranged in said data path from the load/store unit so as to generate and transmit a symbolic entity to said at least one of the arithmetic logic unit and the register unit when an invalid datum is output from the load/store unit for said at least one of the arithmetic logic unit and the register unit, the arithmetic logic unit being configured to propagate the symbolic entity, when present in an operand of an operation carried out by the arithmetic logic unit, to a result of the operation, wherein the symbolic entity generator includes a bit pattern generator operatively arranged to output a Not-a-Number value when an invalid datum is received from the load/store unit, and wherein the arithmetic logic unit is configured to propagate the Not-a-Number value as a Quiet-Not-a-Number value through operations carried out in the arithmetic logic unit responsive to a software command code testing a datum for the presence of a Quiet-Not-a-Number value, and wherein a branch conditional is executed on the result of testing responsive to the software command code, whereby and invalid datum can be handled.

* * * * *